T. H. PRICE & T. F. WADE.
Nut-Warmers.
No. 148,494.  Patented March 10, 1874.
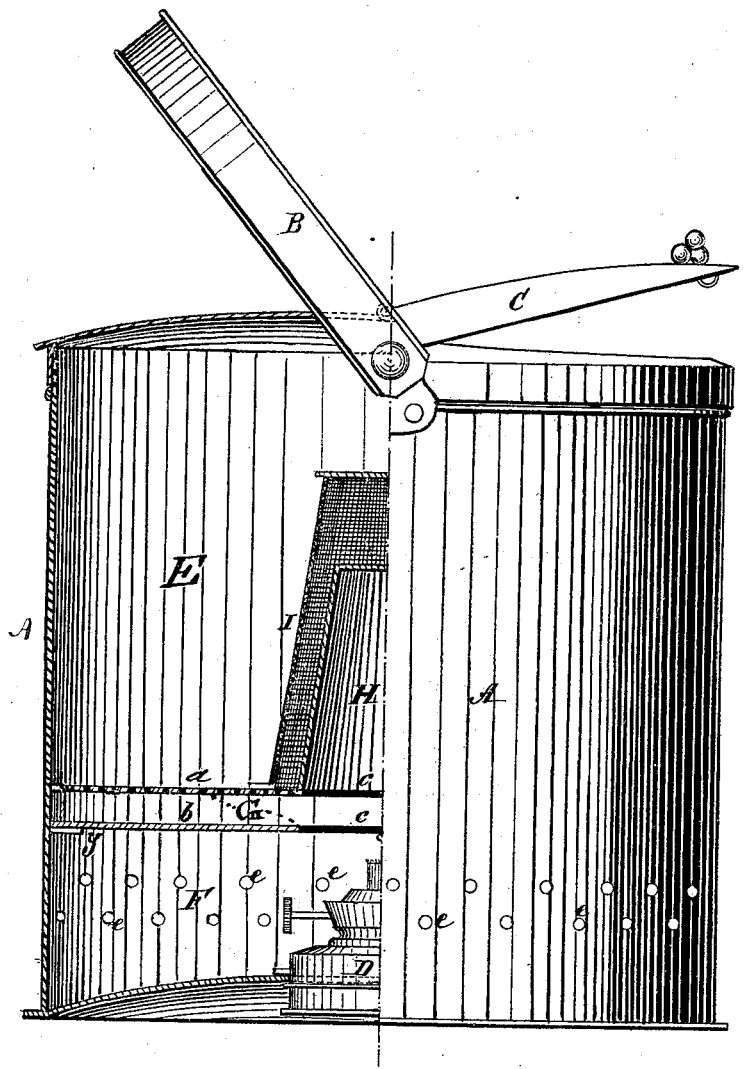
Witnesses.
Inventor.
Per
Attorneys.

UNITED STATES PATENT OFFICE.

THOMAS H. PRICE AND THEODORE F. WADE, OF LA FAYETTE, INDIANA.

IMPROVEMENT IN NUT-WARMERS.

Specification forming part of Letters Patent No. 148,494, dated March 10, 1874; application filed December 15, 1873.

*To all whom it may concern:*

Be it known that we, THOMAS H. PRICE and THEODORE F. WADE, of La Fayette, in the county of Tippecanoe and State of Indiana, have invented a new and Improved Heating Apparatus; and we do hereby declare that the following is a full, clear, and exact description of the same, reference being had to the accompanying drawing forming a part of this specification.

Our invention relates to a portable receptacle for containing and heating or keeping hot roasted peanuts, chestnuts, &c. The same consists in sheet-metal buckets or vessels provided with a handle, and having a perforated diaphragm with a conical centrally-projecting tube, thus forming a compartment above the plate or partition for reception of the nuts, and a smaller one below in which is placed a lamp to supply the required heat.

The drawing represents our improved heater, partly in side and partly in sectional elevation.

The same consists exteriorly of a cylindrical or oval bucket, A, having a pivoted bail or handle, B, and hinged cover C, and a lamp, D, secured in the concave bottom. The interior or chamber of the bucket is divided into compartments E and F by a double diaphragm, G, both parts $a$ $b$ of which have coincident central openings $c$ $c$. The upper part $a$ is perforated between the central opening and the side of the chamber; but the lower one is imperforate. An imperforate cone, H, and perforated or wire-gauze cone I are supported on the upper part $a$, the former being within the latter, with an air-space between them. The wire-gauze cone and the perforated part $a$ of the diaphragm prevent the nuts from coming in direct contact with the imperforate cone and plate $b$ of the diaphragm, but do not materially obstruct the radiation of heat or passage of heated air. A circular opening is formed in the concave bottom of the bucket, and the lamp D secured therein by what may be termed a bayonet fastening. Openings $e$ are formed in the sides of compartment F for the purpose of admitting air to support combustion.

The device is cheaply constructed, and is highly useful for venders of nuts, while not unadapted for laborers and others as a heating apparatus for certain kinds of food.

What we claim is—

The heating apparatus formed of the bucket or vessel A, having compartments E and F, formed by the perforate and imperforate cone and a diaphragm composed of corresponding perforate and imperforate plates $a$ $b$, with central opening $c$, all arranged as shown and described, for the purpose specified.

In testimony whereof the parties have hereunto subscribed their names in presence of two witnesses.

THOMAS H. PRICE.
THEODORE F. WADE.

Attesting witnesses:
B. K. HIGINBOTHAM,
A. ORTH BEHM.